(12) United States Patent
Bhattacharyya et al.

(10) Patent No.: US 11,238,148 B2
(45) Date of Patent: Feb. 1, 2022

(54) LOCATION-BASED, CONTEXT-AWARE CHALLENGE-RESPONSE AUTHENTICATION

(71) Applicant: Cisco Technology, Inc., San Jose, CA (US)

(72) Inventors: Abhishek Bhattacharyya, Fremont, CA (US); Abhishek Mukherji, Fremont, CA (US); Vinay S. Raghuram, Cupertino, CA (US); Santosh Ramrao Patil, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 303 days.

(21) Appl. No.: 16/273,947

(22) Filed: Feb. 12, 2019

(65) Prior Publication Data
US 2020/0257788 A1   Aug. 13, 2020

(51) Int. Cl.
*G06F 21/36* (2013.01)
*G06F 21/60* (2013.01)

(52) U.S. Cl.
CPC ............ *G06F 21/36* (2013.01); *G06F 21/604* (2013.01); *G06F 2221/2103* (2013.01); *G06F 2221/2111* (2013.01); *G06F 2221/2133* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 8,156,539 B1* | 4/2012 | Nelson | H04L 63/107 726/2 |
| 8,621,396 B1 | 12/2013 | Gosseiler, III | |
| 9,584,524 B2 | 2/2017 | Du et al. | |
| 9,591,035 B2 | 3/2017 | Kuo et al. | |
| 10,200,364 B1* | 2/2019 | Ketharaju | H04W 12/66 |
| 10,387,880 B2* | 8/2019 | Lishok | G06Q 20/4014 |
| 10,745,943 B1* | 8/2020 | Jonak | E05B 67/02 |
| 10,824,703 B1* | 11/2020 | Desai | G06F 21/6218 |
| 2004/0049699 A1* | 3/2004 | Griffith | H04L 63/1425 726/23 |
| 2004/0203862 A1* | 10/2004 | Wood | H04W 12/06 455/456.1 |
| 2008/0313725 A1* | 12/2008 | Thiagarajan | G06F 21/35 726/9 |
| 2011/0202461 A1* | 8/2011 | Lundgren | G06Q 20/40 705/44 |

(Continued)

*Primary Examiner* — Michael Pyzocha
(74) *Attorney, Agent, or Firm* — Merchant & Gould P.C.

(57) ABSTRACT

Location-based, context-aware challenge-response authentication may be provided. First, a challenge may be provided to a user. The challenge may be based on a context corresponding to the user. The context corresponding to the user may comprise a location of a device associated with the user within an environment. Next, in response to providing the challenge, a response to the challenge may be received from the user. Then, in response to receiving the response to the challenge, it may be determined that the response is a correct answer to the challenge. In response to determining the response is the correct answer, a privilege may be provided to the user.

19 Claims, 4 Drawing Sheets

(56) References Cited

U.S. PATENT DOCUMENTS

| | | | |
|---|---|---|---|
| 2012/0192252 A1* | 7/2012 | Kuo | H04L 65/1069 726/4 |
| 2013/0237141 A1* | 9/2013 | Hong | H04K 3/43 455/1 |
| 2014/0196143 A1* | 7/2014 | Fliderman | G06F 21/32 726/19 |
| 2015/0230086 A1 | 8/2015 | Bentley et al. | |
| 2016/0285911 A1* | 9/2016 | Goldman | G06F 21/31 |
| 2017/0048678 A1* | 2/2017 | Hong | H04W 4/30 |
| 2017/0142589 A1* | 5/2017 | Park | H04W 12/086 |
| 2017/0262623 A1 | 9/2017 | Plenderleith | |
| 2017/0318461 A1* | 11/2017 | Bender | G06F 21/32 |
| 2018/0173883 A1* | 6/2018 | Gandhi | H04W 12/73 |
| 2018/0275261 A1* | 9/2018 | Khan | H04W 4/02 |
| 2019/0036940 A1* | 1/2019 | Balakrishnan | H04L 61/2007 |
| 2019/0104409 A1* | 4/2019 | Wu | H04L 63/107 |
| 2019/0188368 A1* | 6/2019 | Hastings | H04L 63/0492 |
| 2019/0197543 A1* | 6/2019 | Gupta | G06Q 30/0601 |
| 2019/0207930 A1* | 7/2019 | Vendrow | G06F 21/31 |
| 2019/0258264 A1* | 8/2019 | Bash | G05D 1/102 |
| 2019/0320292 A1* | 10/2019 | Knebl | H04W 4/029 |
| 2020/0065459 A1* | 2/2020 | Himabindu | G06F 21/316 |
| 2020/0201977 A1* | 6/2020 | Le Cardinal | G06F 21/32 |
| 2020/0218824 A1* | 7/2020 | Chu | H04L 67/42 |
| 2021/0141936 A1* | 5/2021 | Sandfort | G06F 11/3082 |

* cited by examiner

LOCATION-BASED, CONTEXT-AWARE CHALLENGE-RESPONSE AUTHENTICATION

TECHNICAL FIELD

The present disclosure relates generally to challenge-response authentication.

BACKGROUND

In computer security, challenge-response authentication is a family of protocols in which one party presents a question ("challenge") and another party must provide a valid answer ("response") to be authenticated. One example of a challenge-response protocol is password authentication, where the challenge is asking for the password and the valid response is the correct password. An adversary who can eavesdrop on a password authentication can then authenticate itself in the same way. One solution is to issue multiple passwords, each of them marked with an identifier. The verifier can ask for any of the passwords, and the prover must have that correct password for that identifier. Assuming that the passwords are chosen independently, an adversary who intercepts one challenge-response message pair has no clues to help with a different challenge at a different time.

Completely Automated Public Turing Test to Tell Computers and Humans Apart (CAPTCHA) is a type of challenge-response test used in computing to determine whether or not the user is human. A CAPTCHA requires that the user type the letters of a distorted image, sometimes with the addition of an obscured sequence of letters or digits that appears on the screen. Because the test is administered by a computer, in contrast to the standard Turing test that is administered by a human, a CAPTCHA is sometimes described as a reverse Turing test.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
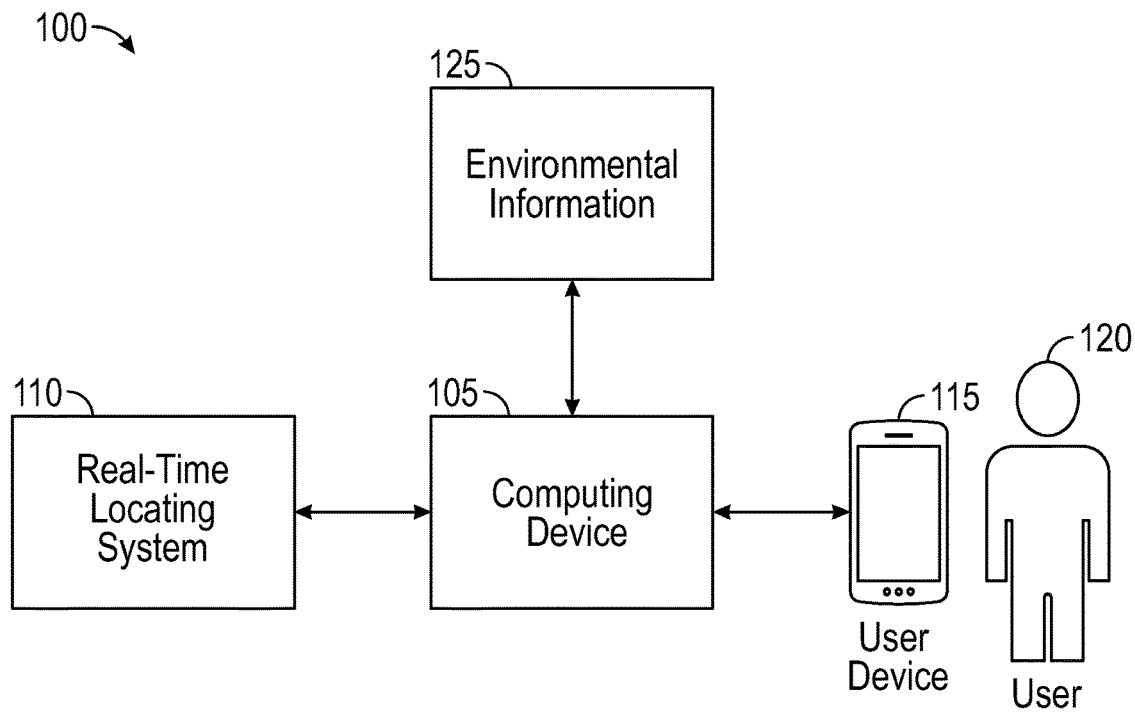
FIG. 1 is a block diagram of a networking system location-based, context-aware challenge-response authentication.

Location-based, context-aware challenge-response authentication may be provided. First, a challenge may be provided to a user. The challenge may be based on a context corresponding to the user. The context corresponding to the user may comprise a location of a device associated with the user within an environment. Next, in response to providing the challenge, a response to the challenge may be received from the user. Then, in response to receiving the response to the challenge, it may be determined that the response is a correct answer to the challenge. In response to determining the response is the correct answer, a privilege may be provided to the user.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Security may be of prime importance in several applications such as building or network access and access to enterprise web applications for example. Strong yet easy-to-perform authentication may be key to establishing the identity of a user. Conventional Identity and Access Management (IAM) systems that may rely on a password or token may be circumvented by a malicious software program or an Artificial Intelligence (AI) application. CAPTCHA may be used as a tool to ensure that only agents with sophisticated intelligence can access secure accounts.

With advancements in AI technology, CAPTCHAs, which rely on an agent's ability to recognize patterns in a series of images, are becoming increasingly vulnerable. For example, there may exist AI applications that may solve conventional CAPTCHAs 70-90% of the time. To prevent this, CAPTCHAs are becoming more complex, such as those that rely on mouse movement detection or those that rely on tasks that humans cannot perform successfully. However, conventional CAPTCHA processes, no matter how complex, may be vulnerable to increasingly sophisticated AI applications that may mimic user inputs or device signals.

Embodiments of the disclosure may perform challenge-response tests based on user context leveraged from an indoor Real-Time Location System (RTLS). Specifically, a device's location may be determined based on readings from a buildings wireless infrastructure. As a result, no AI application may be able to provide an acceptable answer to the challenge-response test consistent with embodiments of the disclosure.

With embodiments of the disclosure, a network may be a single source of truth for challenge-response challenges. With systems going to the Cloud, even browsers outside of enterprises may be able to leverage RTLS-based challenge-response tests. RTLS-based challenge-response tests may also be integrated into existing authentication solutions.

Conventional challenge-response tests may rely on static challenges, such as image recognition of commonly known objects, which are vulnerable to AI applications. Embodiments of the disclosure, however, may leverage RTLSs to provide additional, dynamic context utilizing a user's current or historical location patterns as determined by a network infrastructure and known contextual information that may not be solvable by an AI application.

FIG. 1 is a block diagram of system 100 consistent with embodiments of the disclosure for providing location-based, context-aware challenge-response authentication. As shown in FIG. 1, system 100 may comprise a computing device 105, a Real-Time Locating System (RTLS) 110, a user device 115 associated with a user 120, and environmental information 125.

Elements of system 100 (e.g., computing device 105, RTLS 110, and user device 115) may be practiced in hardware and/or in software (including firmware, resident software, micro-code, etc.) or in any other circuits or systems. The elements of system 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of system 100 may also be practiced using other technologies capable of performing logical operations such as, for example, AND, OR, and NOT, including but not limited to, mechanical, optical, fluidic, and quantum technologies. User device 115 may comprise, but is not limited to, a personal computer, a tablet device, a mobile device, a smartphone, a telephone, a remote control device, a set-top box, a digital video recorder, a cable modem, a cellular base station, a network computer, a mainframe, a router, or other similar microcomputer-based device.

Environmental information 125 may describe an environment in which user device 115 may operate. The environment may comprise, but is not limited to, the interior of a building. Environmental information 125 may be gathered offline. When the environment is the interior of a budding, environmental information 125 may comprise, for example, a two-dimensional map of the interior of the budding or a three-dimensional map of the interior of the building. In addition, environmental information 125 may include Access Point (AP) Media Access Control (MAC) addresses, AP identifiers (e.g., name on label), and AP positions in the interior of the budding referenced to the aforementioned maps. Furthermore, environmental information 125 may include the identity of artifacts and their positions in the interior of the building referenced to the aforementioned maps. The three-dimensional map may be formed of the environment by performing a site survey with, for example, a three-dimensional depth camera device. Artifacts identified in the survey may be used to ask challenges to users (e.g., user 120).

Additionally, location data corresponding to user devices (e.g., user device 115) within the environment may be collected by computing device 105 from RTLS 110 and stored in a knowledge base. Because it may be assumed that user 120 has possession of user device 115 near user 120, the location of user 120 is considered to be the location of user device 115. The location data may be stored as-is, or may be pre-processed such that key patterns may be extracted. For example, the list of meeting rooms that user 120 visited on the same day might be an interesting pattern that may be used for a location-based, context-aware challenge-response challenge.

Computing device 105 may generate location-based, context-aware challenges based, for example, on current or historical indoor locations of user devices (e.g., user device 115) within the environment. Given that an enterprise operating system 100 may control the Wi-Fi network infrastructure as well as WLAN-based indoor location services (e.g., RTLS 110), the location-based, context-aware challenge service within system 100 may have knowledge of user device 115's location in the past and the present. Strong validation may thus be applied by asking user 120 to input information regarding user 120's context.

One advantage of using RTLS 110 based processes is that AI applications may not be able to solve the challenge-response authentication challenges produced by system 100 because the dataset itself is unknown to the AI application. Furthermore challenge-response authentication challenges utilizing location history may be implemented for visually impaired people as well where an audio based system that can relay the questions and answers.

Figure 2:
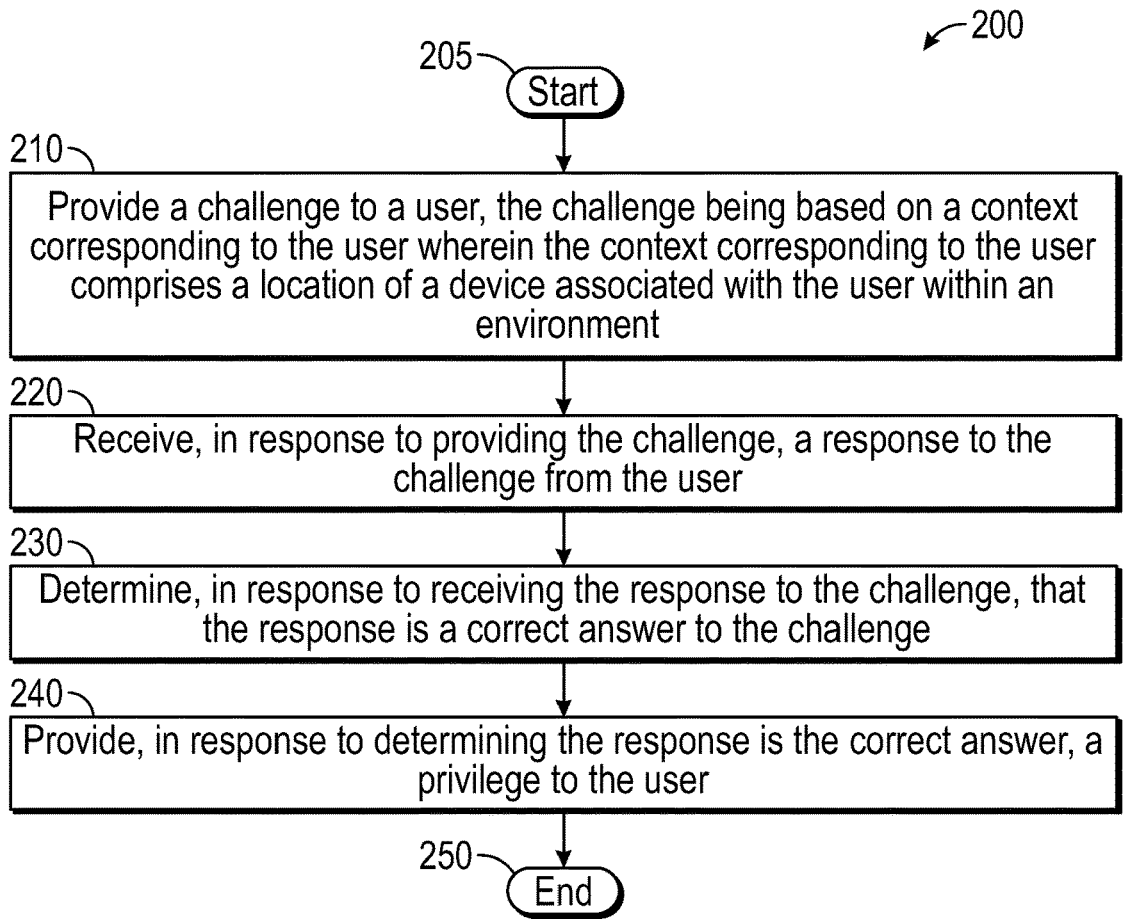
FIG. 2 is a flow chart of a method for providing location-based, context-aware challenge-response authentication.

FIG. 2 is a flow chart setting forth the general stages involved in a method 200 consistent with embodiments of the disclosure for providing location-based, context-aware challenge-response authentication. Method 200 may be implemented using a computing device 105 as described in more detail below with respect to FIG. 1. Ways to implement the stages of method 200 will be described in greater detail below.

Method 200 may begin at starting block 205 and proceed to stage 210 where computing device 105 may provide a challenge to user 120. The challenge may be based on a context corresponding to user 120. The context corresponding to user 120 may comprise a location of user device 115 associated with user 120 within the environment. For example, context may comprise the current location or some location in the past determined by system 100 and associated with some entity in the environment such as break room, elevator, restroom, meeting room, etc. In addition, context may comprise a real artifact near user 120, for example, a picture of the nearest AP, a poster, a meeting room name, or some virtual entity that can be recognized through some available process. A virtual entity artifact may comprise, but not limited to, a hologram. In this example, a challenge may be to dynamically present a hologram of an object (e.g., a horse, a chair, or a fish) and ask user 120 to identify the hologram. User 120 may utilize an Augmented Reality (AR)/Virtual Reality (VR) capability of user device 115 to see the hologram in order to identify it.

Another input for context may comprise the identity of other people co-located with user 120. For example, when user 120 is in a meeting with a colleague, a challenge question may be asking for the identity of other meeting attendees. System 100 may know other meeting attendees from the co-location of their devices as obtained by RTLS 110.

Figure 3:
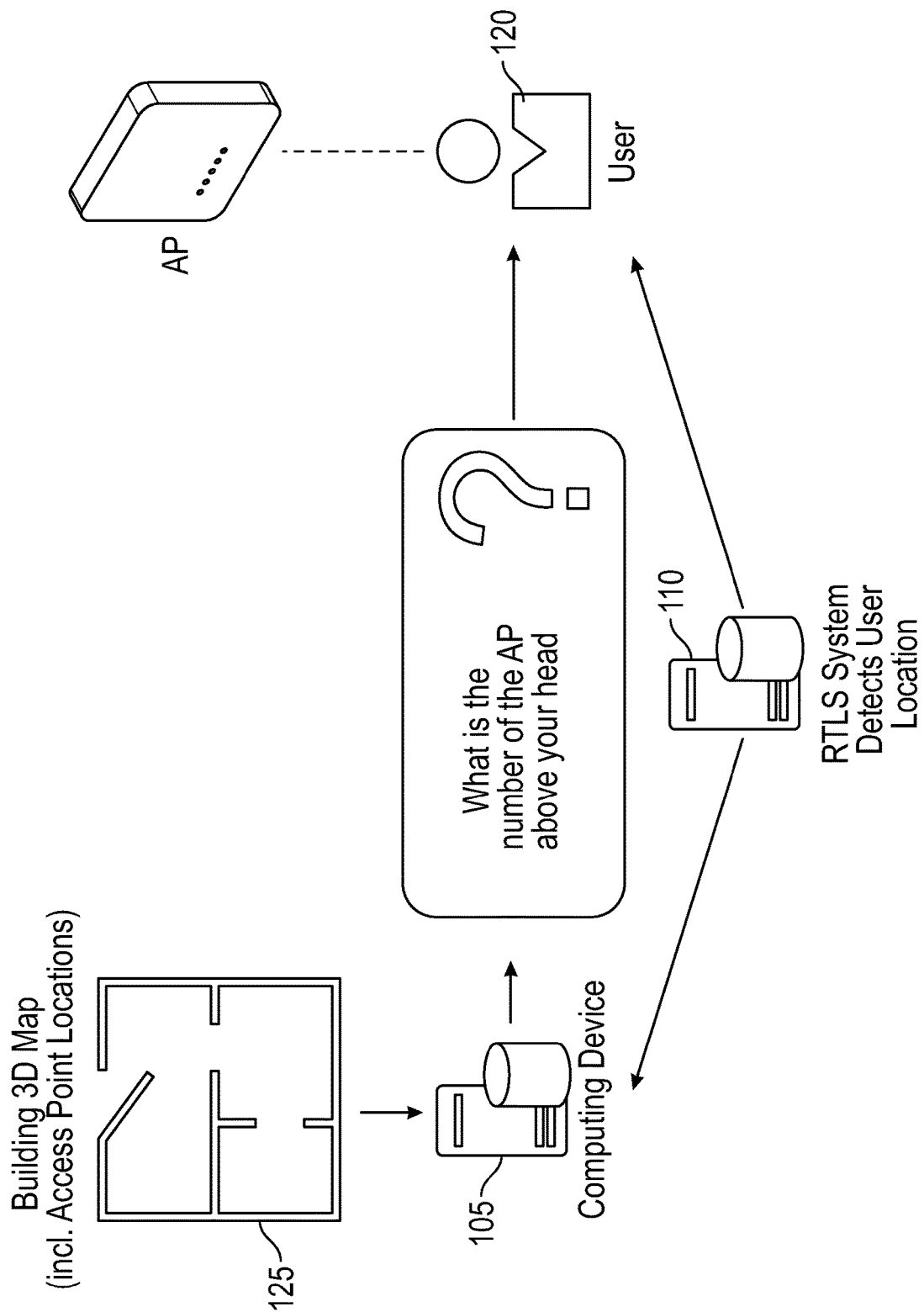
FIG. 3 illustrates an Access Point (AP) location-based, context-aware challenge-response authentication process.
Figure 4:
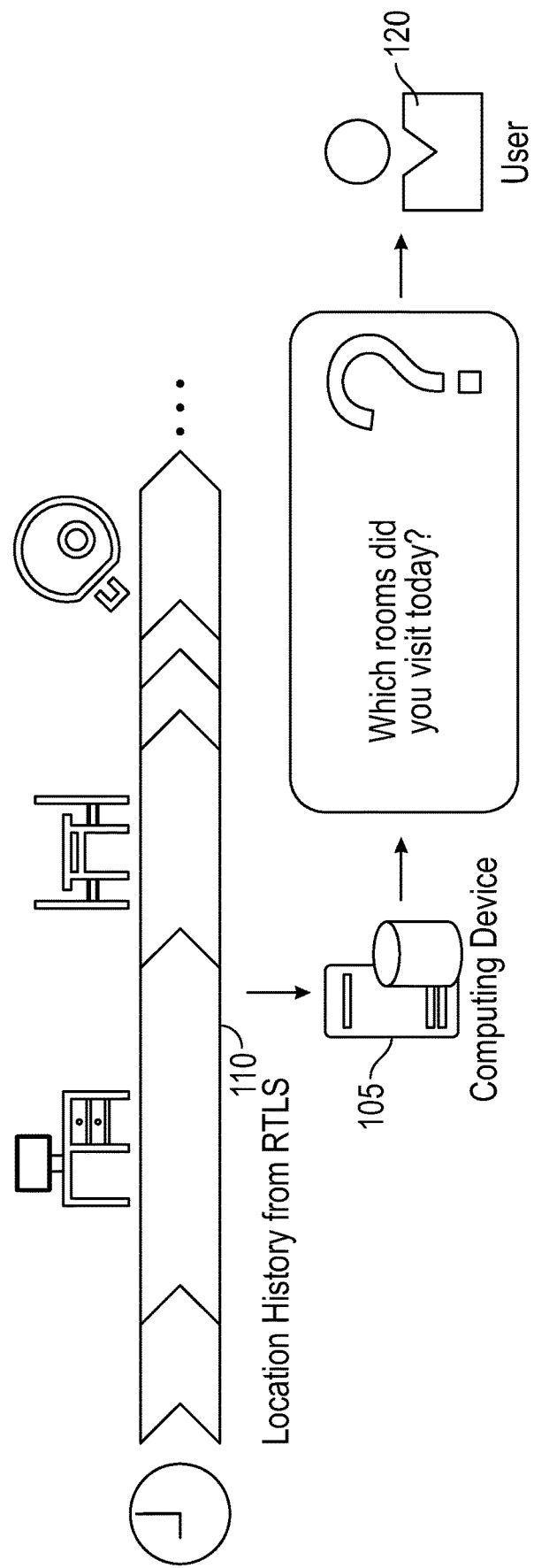
FIG. 4 illustrates a history location-based, context-aware challenge-response authentication process.

As illustrated by FIG. 3, another challenge could be to ask the user to take a picture of a nearest ceiling mounted AP. Computing device 105 may then match an AP identifier from the AP's picture with environmental information 125 that may include a database giving the location of the AP in the picture or the user may be asked to choose the name of the nearest ceiling mounted AP from a choice of multiple APs. In addition, a challenge based on location history may comprise identifying what rooms (e.g., break room, rest room) user 120 has been in the past hour from a list of choices as illustrated by FIG. 4.

Yet another challenge may be to show some form of a challenge question on a digital display such as a telepresence screen in a meeting room in which user 120 is located. The digital display may be associated by environmental information 125 to the location (e.g., room) at which user 120's location has been detected. In another embodiment, an annunciator (e.g., LEDs or special indicators) located, for example, on an AP may be made to blink a particular sequence or pattern that may then be used to answer a challenge-response authentication challenge. The blinking pattern speed may be adapted to make it undetectable to a normal human eye, but detectable by a camera within user device 115. User 120 may record the blinking sequence with user device 115 and provide the recording to computing device 105 as the response to the challenge. Notwithstanding, context may be based on a combination of any of the aforementioned embodiments.

From stage 210, where computing device 105 provides the challenge to user 120, method 200 may advance to stage 220 where computing device 105 may receive, in response to providing the challenge, a response to the challenge from user 120. For example, upon receiving any of the aforementioned location-based, context-aware challenge-response authentication challenge types, user 120 may provide (e.g., using user device 115) a response to the challenge to computing device 105.

Once computing device 105 receives the response to the challenge in stage 220, method 200 may continue to stage 230 where computing device 105 may determine, in response to receiving the response to the challenge, that the response is a correct answer to the challenge. For example, having created the challenge, computing device 105 knows the answer to the challenge. Computing device 105 may compare the response to the challenge received from user 120 against the known correct answer to determine if the response from user 120 is a correct answer.

After computing device 105 determines that the response is a correct answer to the challenge in stage 230, method 200 may proceed to stage 240 where computing device 105 may provide, in response to determining the response is the correct answer, a privilege to user 120. For example, the privilege may comprise, but is not limited to, unlocking a door in the environment at a location of user 120 or providing access for user 120 to a computer application. Once computing device 105 provides the privilege to user 120 in stage 240, method 200 may then end at stage 250.

Conventional challenge-response authentication solutions modify difficulty level based on the number of failed tries. Embodiments of the disclosure may adapt the difficulty level and number of authentication steps based on location and network factors. For example, if user device 115 is heard from APs close to an edge of the environment (e.g., an edge of a building or a building entrance), user device 115 may likely not be inside the environment (e.g., building), but outside the environment (e.g., in a parking lot), thus an elevated level of validation may be desired. In yet another embodiment, coordinated challenges among a group of different users (e.g., colleagues co-located inside a meeting room) may be used, for example, for the group to gain control of a meeting system in the meeting room.

Figure 5:
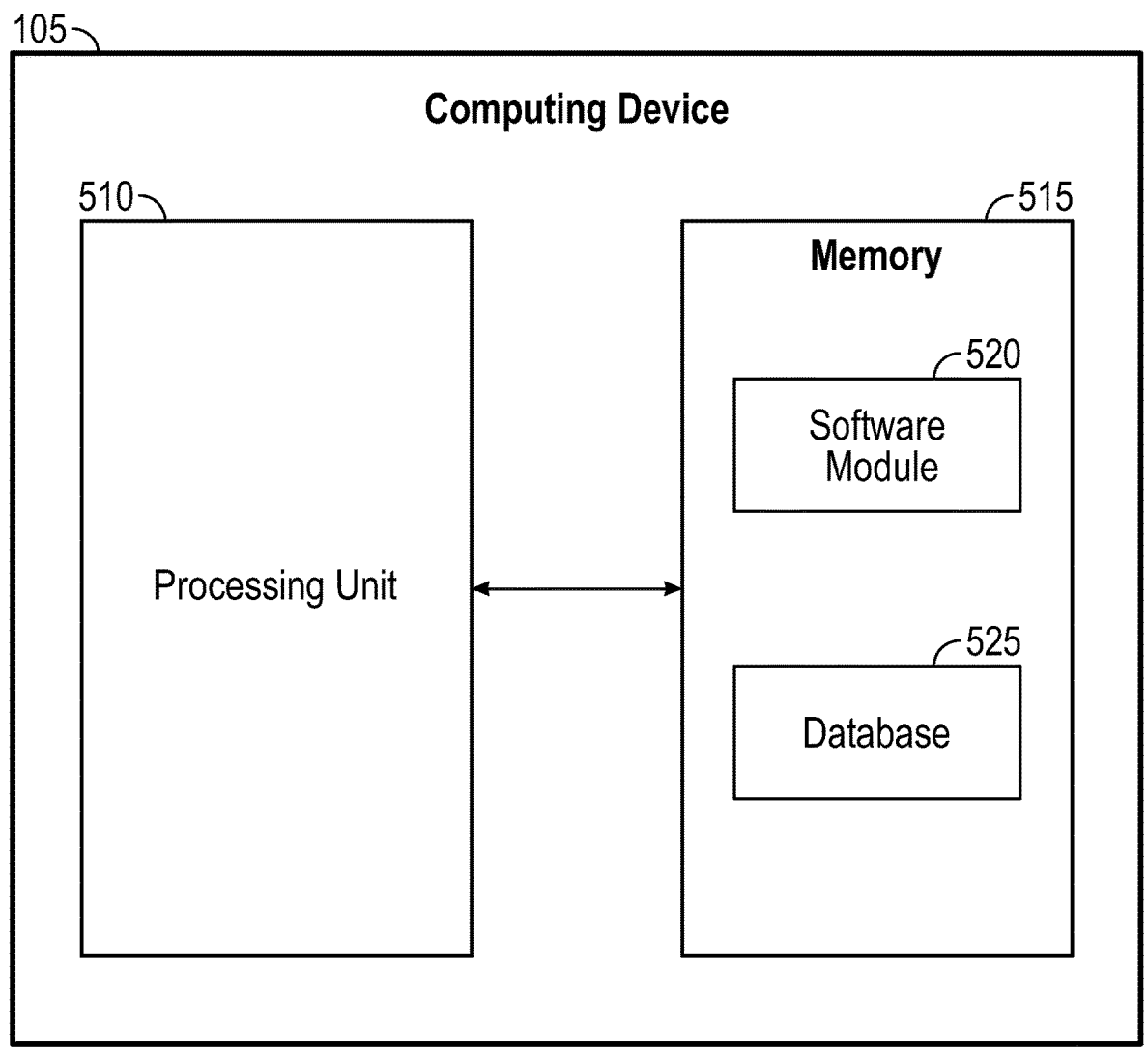
FIG. 5 is a block diagram of a computing device.

FIG. 5 shows computing device 105. As shown in FIG. 5, computing device 105 may include a processing unit 510 and a memory unit 515. Memory unit 515 may include a software module 520 and a database 525. While executing on processing unit 510, software module 520 may perform, for example, processes for providing location-based, context-aware challenge-response authentication, including for example, any one or more of the stages from method 200 described above with respect to FIG. 2.

Computing device 105 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 105 may comprise any computer operating environment, such as hand-held devices, multi-processor systems, microprocessor-based or programmable sender electronic devices, minicomputers, mainframe computers, and the like. Computing device 105 may also be practiced in distributed computing environments where tasks are performed by remote processing devices. The aforementioned systems and devices are examples and computing device 105 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 105 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    providing, by a computing device, a challenge to a user, the challenge being based on a context corresponding to the user, wherein the context corresponding to the user comprises a current location of a device associated with the user within an environment comprising an interior of a building, and wherein providing the challenge to the user further comprises:
        determining that the user is associated with an access point located at an edge of the building, and
        providing, in response to determining that the user is associated with the access point located at the edge of the building, the challenge that is more difficult than one that would have been provided if the device associated with the user was not determined to be associated with the access point closer to the edge of the building;
    receiving, in response to providing the challenge, a response to the challenge from the user;
    determining, in response to receiving the response to the challenge, that the response is a correct answer to the challenge; and
    providing, in response to determining the response is the correct answer, a privilege to the user.

2. The method of claim 1, wherein providing the challenge comprises asking for the current location of the user.

3. The method of claim 1, wherein providing the challenge comprises asking for a past location of the user.

4. The method of claim 1, wherein providing the challenge comprises asking the user to identify an artifact perceivable by the user at the current location of the user.

5. The method of claim 1, wherein providing the challenge comprises asking the user to identify an artifact perceivable by the user at a past location of the user.

6. The method of claim 1, wherein providing the challenge comprises asking the user to identify a person co-located with the user.

7. The method of claim 1, wherein providing the challenge comprises asking the user to identify an Access Point (AP) located at the current location of the user.

8. The method of claim 1, wherein providing the challenge comprises asking the user to identify hologram being presented at the current location of the user.

9. The method of claim 1, wherein providing the challenge comprises providing the challenge on a display associated with the current location of the user.

10. The method of claim 1, wherein providing the challenge comprises providing the challenge comprising a blinking pattern of an annunciator located at the current location of the user.

11. The method of claim 1, wherein providing the privilege comprises providing the privilege comprising unlocking a door at the current location of the user.

12. The method of claim 1, wherein providing the privilege comprises providing the privilege comprising providing access to a computer application.

13. A system comprising:
    a memory storage; and
    a processing unit coupled to the memory storage, wherein the processing unit is operative to:
        provide a challenge to a user, the challenge being based on a context corresponding to the user wherein the context corresponding to the user comprises current location of a device associated with the user within an environment comprising an interior of a building, and wherein the processing unit being operative to provide the challenge to the user further comprises the processing unit being operative to:
            determine that the user is associated with an access point located at an edge of the building, and
            provide, in response to determining that the user is associated with the access point closer to the edge of the building, the challenge that is more difficult than one that would have been provided if the device associated with the user was not determined to be associated with the access point closer to the edge of the building;
        receive, in response to providing the challenge, a response to the challenge from the user;
        determine, in response to receiving the response to the challenge, that the response is a correct answer to the challenge; and
        provide, in response to determining the response is the correct answer, a privilege to the user.

14. The system of claim 13, wherein the processing unit being operative to provide the challenge comprises the processing unit being operative to ask the user to identify an artifact perceivable by the user at the current location of the user.

15. The system of claim 13, wherein the processing unit being operative to provide the challenge comprises the processing unit being operative to ask the user to identify an artifact perceivable by the user at a past location of the user.

16. The system of claim 13, wherein the processing unit being operative to provide the challenge comprises the processing unit being operative to ask the user to identify a person co-located with the user.

17. A method comprising:
receiving, by a computing device, a location of a device associated with a user;
receiving information corresponding to an environment comprising an interior of a building; and
generating a challenge for the user, the challenge being based on a context corresponding to the user wherein the context corresponding to the user comprises a current location of the device associated with the user within the building, wherein generating the challenge to the user further comprises:
determining that the user is associated with an access point located at an edge of the building, and
generating, in response to determining that the user is associated with the access point closer to the edge of the building, the challenge that is more difficult than one that would have been provided if the device associated with the user was not determined to be associated with the access point closer to the edge of the environment.

18. The method of claim 17, wherein receiving the information corresponding to the environment comprises receiving the information corresponding to the environment comprising the interior of a building.

19. The method of claim 17, further comprising:
providing the challenge to the user;
receiving, in response to providing the challenge, a response to the challenge from the user;
determining, in response to receiving the response to the challenge, that the response is a correct answer to the challenge; and
providing, in response to determining the response is the correct answer, a privilege to the user.

* * * * *